United States Patent
Liu et al.

(10) Patent No.: US 9,525,559 B2
(45) Date of Patent: Dec. 20, 2016

(54) CHARGING METHOD AND SYSTEM FOR MTC, AND MESSAGE PROCESSING ENTITY

(71) Applicant: ZTE Corporation, Shenzhen, Guangdong (CN)

(72) Inventors: Qing Liu, Shenzhen (CN); Zhijun Li, Shenzhen (CN); Baoguo Xie, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 32 days.

(21) Appl. No.: 14/377,947

(22) PCT Filed: Mar. 14, 2013

(86) PCT No.: PCT/CN2013/072650
§ 371 (c)(1),
(2) Date: Aug. 11, 2014

(87) PCT Pub. No.: WO2013/139230
PCT Pub. Date: Sep. 26, 2013

(65) Prior Publication Data
US 2015/0016307 A1    Jan. 15, 2015

(30) Foreign Application Priority Data
Mar. 22, 2012  (CN) .......................... 2012 1 0079052

(51) Int. Cl.
*H04W 4/00*     (2009.01)
*H04L 12/14*    (2006.01)
*H04W 4/14*     (2009.01)
*H04M 15/00*    (2006.01)
*H04W 4/24*     (2009.01)

(52) U.S. Cl.
CPC ....... *H04L 12/1425* (2013.01); *H04L 12/1403* (2013.01); *H04L 12/1432* (2013.01);
(Continued)

(58) Field of Classification Search
CPC .. H04L 12/14; H04L 12/1485; H04L 12/1432; H04L 12/1403; H04L 12/1425; H04M 15/00; H04M 15/41; H04M 15/62; H04M 15/66; H04M 15/64; H04M 15/65; H04M 15/77; H04W 4/005; H04W 4/14
(Continued)

(56) References Cited

U.S. PATENT DOCUMENTS

| 2012/0109800 A1* | 5/2012 | Zhou ..................... H04M 15/00 705/34 |
| 2012/0113855 A1* | 5/2012 | Wu ......................... H04L 12/14 370/252 |
| 2013/0003609 A1 | 1/2013 | Ballot |

FOREIGN PATENT DOCUMENTS

| CN | 101222342 A | 7/2008 |
| CN | 102111739 A | 6/2011 |

(Continued)

OTHER PUBLICATIONS

Supplementary European Search Report in European application No. 13764371.4, mailed on Jul. 21, 2015.
(Continued)

*Primary Examiner* — Kwang B Yao
*Assistant Examiner* — Harun Chowdhury
(74) *Attorney, Agent, or Firm* — Oppedahl Patent Law Firm LLC (57) ABSTRACT

Disclosed are a charging method and system for Machine-Type Communication (MTC), and a message processing entity. After receiving an MTC service request message or an MTC service requesting Short Message (SM), a message processing entity generates a charging request including MTC service type information, and sends the charging request to an online charging subsystem/offline charging subsystem; and after receiving the charging request, the online charging subsystem/offline charging subsystem performs a charging operation using a charging method corresponding to the MTC service type information, and returns a charging response to the message processing entity. With the disclosure, charging for different MTC services can be (Continued)

implemented, such that charging is performed more accurately.

17 Claims, 7 Drawing Sheets

(52) U.S. Cl.
CPC ........ *H04L 12/1485* (2013.01); *H04M 15/62* (2013.01); *H04M 15/64* (2013.01); *H04M 15/65* (2013.01); *H04M 15/77* (2013.01); *H04W 4/005* (2013.01); *H04W 4/14* (2013.01); *H04M 2215/28* (2013.01); *H04W 4/24* (2013.01)

(58) Field of Classification Search
USPC .... 370/252, 259, 338, 390; 705/34; 455/406
See application file for complete search history.

(56) References Cited

FOREIGN PATENT DOCUMENTS

| | | | |
|---|---|---|---|
| EP | 2247028 | A1 | 11/2010 |
| WO | 2011083065 | A1 | 7/2011 |

OTHER PUBLICATIONS

Architecture Enhancements to facilitate communications with Packet Data Networks and Applications, Feb. 24, 2012.
Application Specific Identifiers on MTCsp Interface, Sep. 30, 2011.
System Improvements for Machine-Type Communications, Mar. 5, 2012.
Recording Information for Statistical and Offline Charging purposes in M2M, Mar. 12, 2012.
Charging consideration, Feb. 15, 2012.
International Search Report in international application No. PCT/CN2013/072650, mailed on Jun. 20, 2013.
English Translation of the Written Opinion of the International Search Authority in international application No. PCT/CN2013/072650, mailed on Jun. 20, 2013.

\* cited by examiner

CHARGING METHOD AND SYSTEM FOR MTC, AND MESSAGE PROCESSING ENTITY

TECHNICAL FIELD

The disclosure relates to a field of Machine-Type Communication (MTC) technology, and particularly to a charging method and system for MTC, and a message processing entity.

BACKGROUND

Machine to Machine (M2M) communication, namely the MTC, refers to communication between two MTC devices or communication between an MTC device and an MTC server. The MTC applies widely in aspects such as transportation (logistic scheduling, positioning and navigation), electricity (remote meter reading and load monitoring), city management (elevator monitoring, street lamp control), and home life (elderly care, home security), and may be implemented via a network of an operator.

Figure 1:
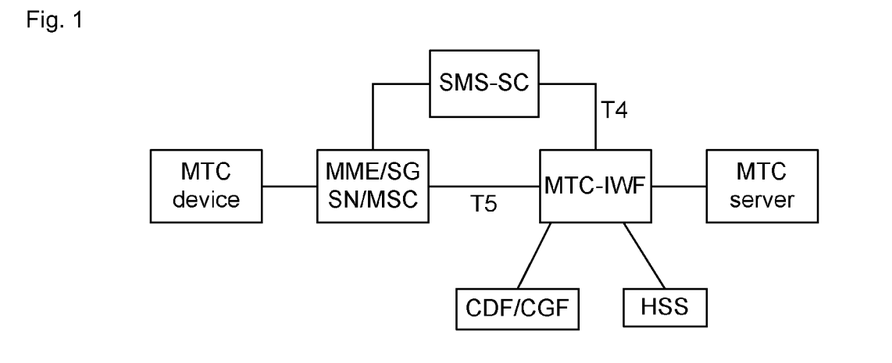
FIG. 1 is a schematic diagram of MTC architecture in related art.

FIG. 1 is a schematic diagram of MTC architecture in related art, where an Evolved Packet System (EPS) serves as a bottom layer bearer network. A mobile network functioning network element and an MTC service functioning network element are included in FIG. 1.

A mobile network functioning network element includes: a Mobile Switching Centre (MSC), a Serving General Packet Radio Service Support Node (SGSN), a Mobility Management Entity (MME), a Home Subscriber Server (HSS), a Short Message Service-Service Centre (SMS-SC), a Charging Data Function (CDF), a Charging Gateway Function (CGF), etc.

An MTC service functioning network element includes: an MTC InterWorking Function (MTC-IWF) entity, an MTC server, and an MTC device.

An MTC-IWF is an access gateway provided by a mobile network to an MTC, and mainly serves for: implementing InterWorking of an external Internet Protocol (IP) network (where an MTC server is usually located) and the mobile network; authenticating an identifier of an MTC server; authorizing control-plane request signalling sent by an MTC server; and receiving and responding to a series of device trigger request sent by an MTC server.

In an MTC service, a most typical and most important service is a device trigger, in which when there is no application-layer contact (such as service registering contact) between an MTC server and an MTC device and the MTC server is to communicate with the MTC device, the MTC server sends requests a mobile network to convey a device trigger request sent by the MTC server to the MTC device, such that after receiving the device trigger request, the MTC device can take the initiative to establish a communication connection with the MTC server.

In related art, a trigger sent by an MTC server to an MTC device has to go through an MTC-IWF, which delivers the trigger to a core network element. The core network element delivers the trigger to the target MTC device through a proper route. An MTC-IWF may forward the trigger to an MTC device in two ways as follows:

1. the MTC-IWF converts the received trigger into a Short Message (SM) format trigger and delivers the trigger to an SMS-SC through a T4 interface, and the trigger is then forwarded to the MTC device; or 2. the MTC-IWF delivers the trigger to an MME/SGSN/MSC through a T5 interface, and the MME/SGSN/MSC may deliver the trigger to the target MTC device directly through a downlink Network Access Service (NAS) message.

As MTC device trigger is different from a general messaging service such as a Short Message Service (SMS), charging for MTC device trigger differs significantly from general SM charging.

When a trigger is delivered by SMS, with an existing charging method for SMS, the trigger cannot be distinguished from a general short message; a source sending the trigger (which is an MTC service provider usually) cannot be identified explicitly, such that a discriminatory charging strategy cannot be applied.

Figure 2:
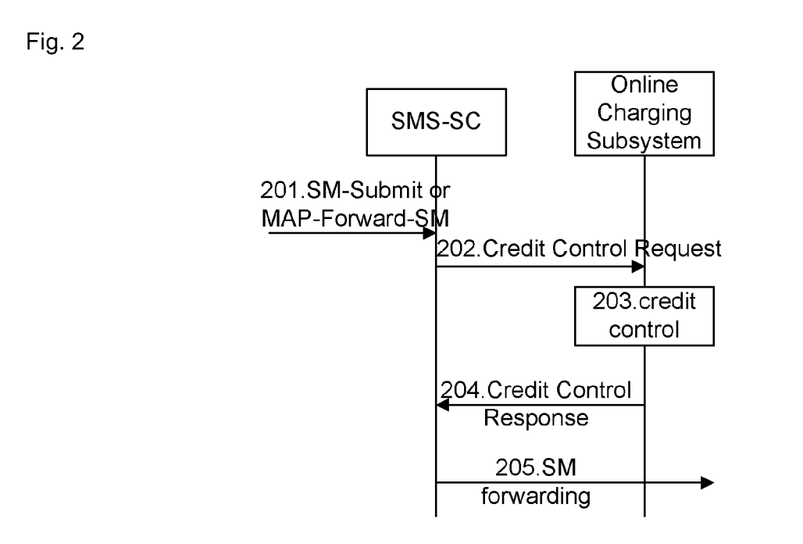
FIG. 2 is a flowchart of online charging for SMS in related art.

FIG. 2 is a flowchart of online charging for SMS in related art, where after receiving a short message (SM), while delivering/forwarding the SM, an SMS node generates charging information for the SM and sends the charging information for the SM to an Online Charging Subsystem (OCS).

The SMS node may be an SMS router, an Internet Protocol-Short Message-Gateway (IP-SM-GW) or an SMS-SC.

In the flow as shown in FIG. 2, taking the SMS-SC as an example, a charging flow for SMS may include steps as follows.

In Step 201, an SMS-SC receives an incoming SM-Submit or MAP-Forward-SM.

In Step 202, the SMS-SC sends an OCS a Credit Control Request (CCR) including an SM-Message-Type field indicating an SM type such as an SM to be submitted or an SM to be forwarded.

The CCR may be a debit units request in Immediate Event Charging (IEC), or a Reserve Units Request Initial/Terminate in Event Charging with Unit Reservation (ECUR).

In Step 203, the OCS performs credit control according to the received request.

In Step 204, the OCS returns a Credit Control Response (CCA) to the SMS-SC.

The CCA may be a Debit Units Response in IEC, or a Reserve Units Response Initial/Terminate in ECUR.

In Step 205, the SMS-SC continues to execute an SM forwarding flow.

It can be seen from the flow in FIG. 2 that with an existing charging mechanism for SM, it is only possible to identify an SM to be submitted or an SM to be forwarded, instead of identifying an SM of a particular service For example, in device trigger in an MTC service, when an SM is used to bear a device trigger request, with an existing charging mechanism, a flexible charging requirement for the MTC service cannot be fulfilled, as it cannot tell whether an SM is for a particular service such as device trigger in an MTC service, thereby failing to charge for different service types.

MTC-service development demands more from a mobile network, such as small data transmission, location specific trigger, etc. Such services all demand for discriminatory charging. For example, when control plane signalling is used for bearing a service load, efficient identification of an MTC service type will be key to a charging system.

Further, even for services of the type, charging will differ depending on different SM senders. To meet such requirements, a charging system has to obtain more information.

In view of this, a charging method for an MTC service has to be proposed, such that a charging system can obtain effective information enough for identifying MTC service information, so as to charge with discrimination. However, there is no such solution in related art.

SUMMARY

In view of this, it is desired that embodiments of the disclosure provide a charging method and system for MTC, and a message processing entity, capable of implementing charging according to different MTC services, such that charging is performed more accurately.

To this end, a technical solution according to an embodiment of the disclosure is implemented as follows.

An embodiment of the disclosure provides a charging method for Machine-Type Communication (MTC), including steps of:

after receiving an MTC service request message or an MTC service requesting Short Message (SM), generating, by a message processing entity, a charging request including MTC service type information, and sending the charging request to an online charging subsystem/offline charging subsystem; and after receiving the charging request, performing, by the online charging subsystem/offline charging subsystem, a charging operation using a charging strategy corresponding to the MTC service type information, and returning a charging response to the message processing entity.

In an embodiment, the method may further include a step of:

after receiving the charging request, reserving, by the online charging subsystem, a unit for an account or charging an account in real time according to the MTC service type information;

or, after receiving the charging request, filling, by the offline charging subsystem, the MTC service type information in a charging data record generated by the message processing entity.

In an embodiment, the MTC service type information may include a combination of one or more of:

an MTC service type identifier, an MTC InterWorking Function (MTC-IWF) identifier, and an MTC server identifier, wherein the MTC service type identifier may be one of: an MTC device trigger identifier, an MTC location specific trigger identifier, and an MTC small data packet transmission identifier.

In an embodiment, different MTC service types may be distinguished from each other according to the MTC service type information by:

determining, by the online charging subsystem/offline charging subsystem, an MTC service type corresponding to the MTC service type identifier included in the charging request; and/or inferring, by the online charging subsystem/offline charging subsystem, an MTC service type corresponding to the MTC-IWF identifier included in the charging request; and/or inferring, by the online charging subsystem/offline charging subsystem, an MTC service type corresponding to the MTC server identifier included in the charging request.

In an embodiment, the message processing entity may obtain the MTC service type information included in the MTC service request message or the MTC service requesting SM by:

obtaining the MTC service type information from a message type of a header of the MTC service request message or the MTC service requesting SM; or obtaining the MTC service type information from a service type of a header of the MTC service request message or the MTC service requesting SM; or obtaining the MTC service type information from a byte of a body of the MTC service request message or the MTC service requesting SM.

In an embodiment, the charging request may be a Credit Control Request (CCR) in online charging or an Accounting Request (ACR) in offline charging.

In an embodiment, the message processing entity may be an MTC InterWorking Function (MTC-IWF) and/or a Short Message Service-Service Centre (SMS-SC).

An embodiment of the disclosure further provides a charging system for Machine-Type Communication (MTC), including: a message processing entity and an online charging subsystem/offline charging subsystem, wherein the message processing entity is configured for: after receiving an MTC service request message or an MTC service requesting Short Message (SM), generating a charging request including MTC service type information, and sending the charging request to the online charging subsystem/offline charging subsystem; and the online charging subsystem/offline charging subsystem is configured for: after receiving the charging request, performing a charging operation using a charging method corresponding to the MTC service type information, and returning a charging response to the message processing entity.

In an embodiment, the online charging subsystem may be configured for: after receiving the charging request, reserving a unit for an account or charging an account in real time according to the MTC service type information; and the offline charging subsystem may be configured for: after receiving the charging request, filling the MTC service type information in a charging data record generated by the message processing entity.

In an embodiment, the MTC service type information may include a combination of one or more of:

an MTC service type identifier, an MTC InterWorking Function (MTC-IWF) identifier, and an MTC server identifier, wherein the MTC service type identifier may be one of: an MTC device trigger identifier, an MTC location specific trigger identifier, and an MTC small data packet transmission identifier.

In an embodiment, the online charging subsystem/offline charging subsystem may be further configured for:

determining an MTC service type corresponding to the MTC service type identifier included in the charging request; and/or inferring an MTC service type corresponding to the MTC-IWF identifier included in the charging request; and/or inferring an MTC service type corresponding to the MTC server identifier included in the charging request.

In an embodiment, the message processing entity may be further configured for obtaining the MTC service type information included in the MTC service request message or the MTC service requesting SM by:

obtaining the MTC service type information from a message type of a header of the MTC service request message or the MTC service requesting SM; or obtaining the MTC service type information from a service type of a header of the MTC service request message or the MTC service requesting SM; or obtaining the MTC service type information from a byte of a body of the MTC service request message or the MTC service requesting SM.

In an embodiment, the charging request may be a Credit Control Request (CCR) in online charging or an Accounting Request (ACR) in offline charging.

In an embodiment, the message processing entity may be an MTC InterWorking Function (MTC-IWF) and/or a Short Message Service-Service Centre (SMS-SC).

An embodiment of the disclosure further provides a message processing entity, including: a message receiving module, a charging request generating module, and a message sending module, wherein the message receiving module is configured for: receiving a Machine-Type Communication (MTC) service request message or an MTC service requesting Short Message (SM), obtaining MTC service type information included in the MTC service request message or the MTC service requesting SM, sending the MTC service type information to the charging request generating module, and sending the MTC service request message or the MTC service requesting SM to the charging request generating module and the message sending module;

the charging request generating module is configured for: after receiving the MTC service type information, generating a charging request including the MTC service type information, and sending the charging request to an online charging subsystem/offline charging subsystem; and the message sending module is configured for: after receiving the MTC service request message or the MTC service requesting SM, forwarding the MTC service request message or the MTC service requesting SM to a subsequent network element; or after receiving the MTC service request message or the MTC service requesting SM, storing the MTC service request message or the MTC service requesting SM locally, and after receiving a charging response sent by the online charging subsystem/offline charging subsystem, forwarding the MTC service request message or the MTC service requesting SM to a subsequent network element.

In an embodiment, the MTC service type information may include a combination of one or more of:

an MTC service type identifier, an MTC InterWorking Function (MTC-IWF) identifier, and an MTC server identifier, wherein the MTC service type identifier may be one of: an MTC device trigger identifier, an MTC location specific trigger identifier, and an MTC small data packet transmission identifier.

In an embodiment, the message receiving module may be further configured for obtaining the MTC service type information included in the MTC service request message or the MTC service requesting SM by:

obtaining the MTC service type information from a message type of a header of the MTC service request message or the MTC service requesting SM; or obtaining the MTC service type information from a service type of a header of the MTC service request message or the MTC service requesting SM; or obtaining the MTC service type information from a byte of a body of the MTC service request message or the MTC service requesting SM.

In an embodiment, the charging request may be a Credit Control Request (CCR) in online charging or an Accounting Request (ACR) in offline charging.

In an embodiment, the message processing entity may be an MTC InterWorking Function (MTC-IWF) and/or a Short Message Service-Service Centre (SMS-SC).

With the charging method and system for MTC as well as the message processing entity provided by embodiments of the disclosure, it is possible to trigger charging flexibly according to different charging requirements for different MTC services, and implement charging for different MTC services, such that charging may be performed more accurately.

DETAILED DESCRIPTION

A technical solution according to an embodiment of the disclosure is further elaborated below with reference to drawings and specific embodiments.

Figure 3:
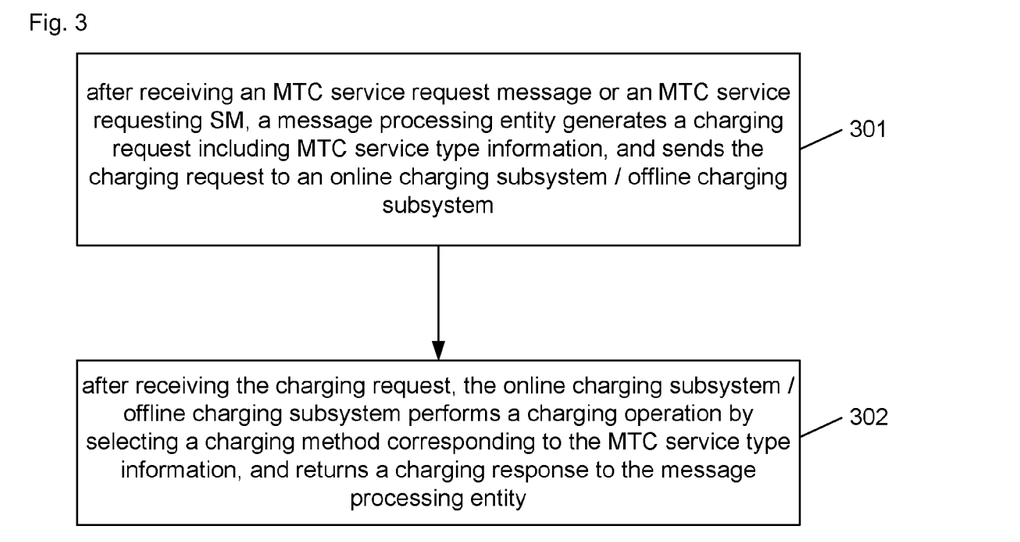
FIG. 3 is a flowchart of a charging method for MTC according to an embodiment of the disclosure.

The embodiment of the disclosure provides a charging method for MTC. As shown in FIG. 3, the method mainly includes steps as follows.

In Step 301, after receiving an MTC service request message or an MTC service requesting SM, a message processing entity generates a charging request including MTC service type information, and sends the charging request to an online charging subsystem/offline charging subsystem.

The message processing entity may be an MTC-IWF and/or an SMS-SC.

The MTC service request message may concern a device trigger request, or may be an MTC service request message of a small data transmission request or a location specific trigger request. Embodiments herein are not limited to an MTC service request message of these types.

The MTC service type information may include a combination of one or more of: an MTC service type identifier, an MTC server identifier, and an MTC-IWF identifier.

The MTC service type identifier may be one of: an MTC device trigger identifier, an MTC location specific trigger identifier, and an MTC small data packet transmission identifier.

The MTC service type identifier, the MTC server identifier and the MTC-IWF identifier may be Attribute Value Pairs (AVP) of, for example, signed integers 32/64, an enumerated type, addresses, any variable-length OctetString grouped with a group of data types, or the like. Embodiments herein are not limited to such types of AVPs.

The MTC service type identifier may be obtained from the received MTC service request message or MTC service requesting SM. Different types of MTC services can be distinguished by the MTC service type identifier.

The MEC service identifier may be generated by an MTC server or allocated by an operator, and be included in the MTC service request message or the MTC service requesting SM. An MTC service type may be inferred according to the MEC service identifier. For example, an operator may provide that device trigger is performed via MTC Server 1, while small data transmission is performed via MTC server 2, then an online charging subsystem/offline charging subsystem may determine a specific MTC service according to an MTC server identifier, and then perform a charging operation using a charging strategy corresponding to the specific MTC service.

The MTC-IWF identifier may be generated by an MTC-IWF or allocated by an operator, and be included in the MTC service request message or the MTC service requesting SM. An MTC service type may be inferred according to the MTC-IWF identifier. For example, an operator may provide that device trigger is performed via MTC-IWF 1, while small data transmission is performed via MTC-IWF 2, then an online charging subsystem/offline charging subsystem may determine a specific MTC service according to an MTC-IWF service identifier, and then perform a charging operation using a charging strategy corresponding to the specific MTC service.

The online charging subsystem/offline charging subsystem may also distinguish an SM in a traditional service and an SM in an MTC service by determining whether an MTC-IWF identifier is included in the charging request. For example a triggering SM is distinguished from a general SM. Thus, the online charging subsystem/offline charging subsystem may perform a charging operation using a charging strategy corresponding to an SM type.

1. The message processing entity may obtain the MTC service type information from a message type of a header of the MTC service request message or the MTC service requesting SM, where for example the message type may be defined directly as an MTC device trigger request; or 2. The message processing entity may obtain the MTC service type information from a service type of a header of the MTC service request message or the MTC service requesting SM, where for example different bytes of the service type may be used to represent device trigger, small data transmission, etc. respectively; or 3. The message processing entity may obtain the MTC service type information from a certain bytes of a body of the MTC service request message or the MTC service requesting SM, where for example a specific character in the first few bytes of the body of the SM may represent that the SM is an MTC service type SM.

In Step 302, after receiving the charging request, the online charging subsystem/offline charging subsystem performs a charging operation by selecting a charging method corresponding to the MTC service type information, and returns a charging response to the message processing entity.

The charging request may be a credit control request (CCR) in online charging or an Accounting Request (ACR) in offline charging. The charging request contains the MTC service type information.

The charging method may include a step of:

after receiving the charging request, reserving, by the online charging subsystem, a unit for an account or charging an account in real time according to the MTC service type information;

or, after receiving the charging request, filling, by the offline charging subsystem, the MTC service type information in a charging data record generated by the message processing entity.

An operator may adopt a flexible charging strategy for an MTC service according to the MTC service type information, user subscription information, etc. For example a charging strategy may be that different rates are determined according to different MTC services. For example:

rate 1 is adopted for MTC Service Type 1, and rate 2 is adopted for Service Type 2;

or, rate 1 is adopted for MTC Service Type 1 sent by MTC Server 1, and rate 2 is adopted for MTC Service Type 1 sent by MTC Server 2;

or, rate 1 is adopted for MTC Service Type 1 sent by MTC Server 1 and MTC-IWF 1, and MTC Service Type 1 sent by MTC Server 1 and MTC-IWF 2 is free of charge, etc.

The charging strategies are illustrated only as examples, a charging strategy according to an embodiment of the disclosure is not limited to the illustrated ones but may be specifically set as needed.

Corresponding to the charging method for MTC, an embodiment of the disclosure further provides a charging system for MTC, including a message processing entity and an online charging subsystem/offline charging subsystem, of which a function is implemented as aforementioned and is not repeated here.

Figure 4:
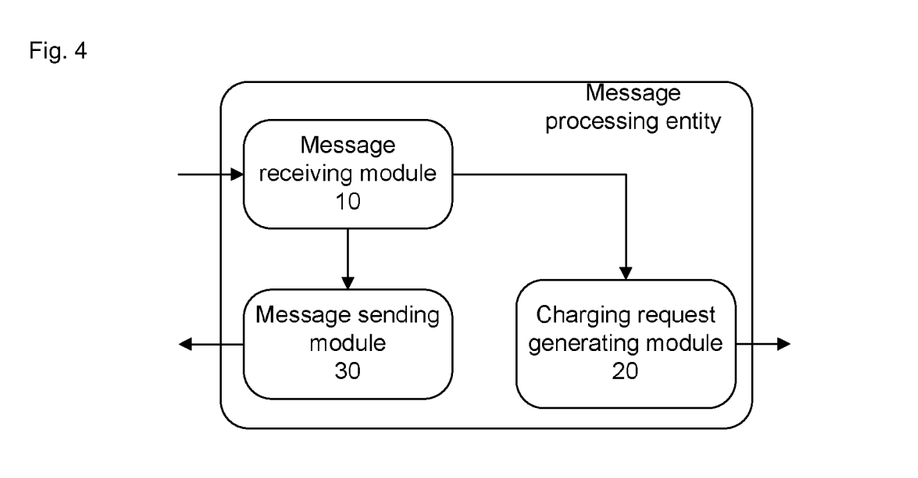
FIG. 4 is a schematic diagram of a structure of a message processing entity according to an embodiment of the disclosure.

FIG. 4 is a schematic diagram of a structure of a message processing entity according to an embodiment of the disclosure. As shown in FIG. 4, the message process entity mainly includes: a message receiving module 10, a charging request generating module 20 and a message sending module 30. The message processing entity may be an MTC-IWF or an SMS-SC. A main function of each module is as follows.

The message receiving module 10 may be configured for: receiving an MTC service request message or an MTC service requesting SM, obtaining MTC service type information included in the MTC service request message or the MTC service requesting SM, sending the MTC service type information to the charging request generating module 20, and forwarding the MTC service request message or the MTC service requesting SM to the charging request generating module 20 and the message sending module 30.

The MTC service request message may concern a device trigger request, or may be an MTC service request message of a small data transmission request or a location specific trigger request. Embodiments herein are not limited to an MTC service request message of these types.

The MTC service request message or the MTC service requesting SM may include the MTC service type information, which may be a combination of one or more of: an MTC service type identifier, an MTC-IWF identifier, and an MTC server identifier. The MTC service type identifier may be one of: an MTC device trigger identifier, an MTC location specific trigger identifier, and an MTC small data packet transmission identifier.

In an embodiment, the MTC service type information may include an MTC service type identifier, and may further include an MTC-IWF identifier and/or an MTC server identifier.

The charging request generating module 20 may be configured for: after receiving the MTC service type information included in the MTC service request message or MTC service requesting SM, generating a charging request including the MTC service type information, and sending the charging request to an online charging subsystem/offline charging subsystem.

The MTC service type information may be a combination of one or more of: an MTC service type identifier, an MTC server identifier, and an MTC-IWF identifier The charging request may be a credit control request (CCR) in online charging or an Accounting Request (ACR) in offline charging. The charging request contains the MTC service type information.

In an embodiment, the MTC service type information may include an MTC service type identifier, and may further include an MTC-IWF identifier and/or an MTC server identifier.

The message sending module 30 may be configured for: receiving the MTC service request message or the MTC service requesting SM forwarded by the message receiving module 10; forwarding the MTC service request message or the MTC service requesting SM to a subsequent network element, or storing the MTC service request message or the MTC service requesting SM locally and after receiving a charging response sent by the online charging subsystem/offline charging subsystem, forwarding the MTC service request message or the MTC service requesting SM to a subsequent network element.

When the message processing entity is an MTC-IWF, the message sending module 30 may convert the MTC service request message to the MTC service requesting SM.

The subsequent network element may be one of an SMS-SC, an MME, an SGSN and an MSC.

Figure 5:
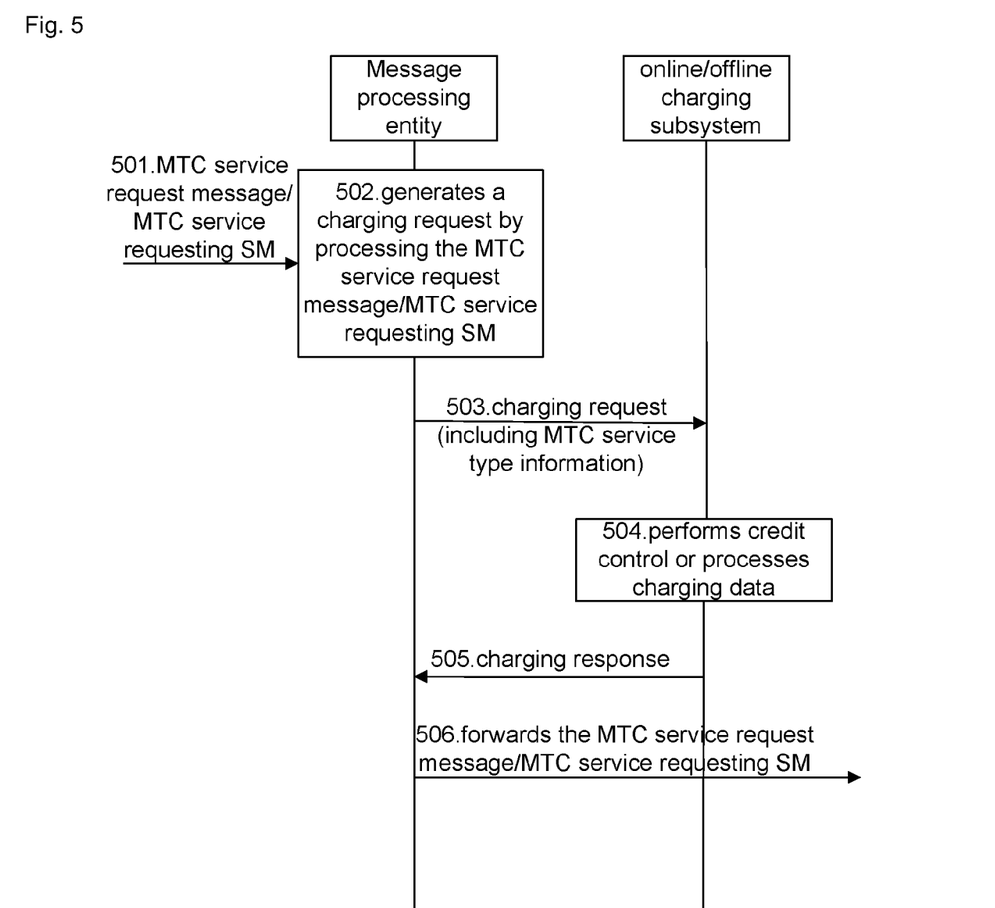
FIG. 5 is a flowchart of charging by a message processing entity according to an embodiment of the disclosure.

FIG. 5 is a flowchart of charging by a message processing entity according to an embodiment of the disclosure; as shown in FIG. 5, the flow may include steps as follows.

In Step 501, a message processing entity receives an MTC service request message/MTC service requesting SM.

In Step 502: the message processing entity generates a charging request including MTC service type information by processing the MTC service request message/MTC service requesting SM received.

The message processing entity may be an MTC-IWF or an SMS-SC.

The MTC service type information may include a combination of one or more of an MTC service type identifier, an MTC-IWF identifier, and an MTC server identifier.

In an embodiment, the MTC service type information may include an MTC service type identifier, and may further include an MTC-IWF identifier and/or an MTC server identifier.

The message processing entity processes the received MTC service request message or MTC service requesting SM as follows.

1. the message receiving module of the message processing entity receives the MTC service request message or the MTC service requesting SM, and obtains the MTC service type information included in the MTC service request message or the MTC service requesting SM.

When the message processing entity is an MTC-IWF, the message receiving module may obtain corresponding MTC service type information from the received MTC service request message.

When the message processing entity is an SMS-SC, the message receiving module may obtain corresponding MTC service type information from the received MTC service requesting SM.

A. The MTC service type information may be obtained from a message type of a header of the MTC service request message or the MTC service requesting SM, where for example the message type may be defined directly as an MTC device trigger request; or B. The MTC service type information may be obtained from a service type of a header of the MTC service request message or the MTC service requesting SM, where for example different bytes of the service type may be used to represent device trigger, small data transmission, etc. respectively; or C. The MTC service type information may be obtained from a certain bytes of a body of the MTC service request message or the MTC service requesting SM, where for example a specific character in the first few bytes of the body of the SM may represent that the SM is an MTC service type SM.

2. the message receiving module of the message processing entity sends the obtained MTC service type information to the charging request generating module of the message processing entity to trigger the charging request generating module to generate a charging request, and at the same time sends the MTC service request message or the MTC service requesting SM to the message sending module of the message processing entity.

When the message processing entity is an MTC-IWF, then the message sending module may convert the MTC service request message into an MTC service requesting SM.

Further, when offline charging is adopted, the charging request generating module generates a charging request (ACR) in offline charging according to the MTC service type information, and sends the charging request to the offline charging subsystem; meanwhile, the message sending module of the message processing entity forwards the MTC service request message or the MTC service requesting SM to a subsequent network element.

The subsequent network element may be one of an SMS-SC, an MME, an SGSN, and an MSC.

Further, in online charging, the charging request generating module generates a Credit Control Request (CCR) in online charging according to the MTC service type information and sends the CCR to the online charging subsystem; meanwhile, the message sending module of the message processing entity temperately store the MTC service request message or the MTC service requesting SM.

In Step 503, the message processing entity sends an online/offline charging subsystem the charging request including the MTC service type information.

The charging request may be a CCR or an ACR.

The MTC service type information is as described in Step 502.

In Step 504: after receiving the charging request, the online charging subsystem reserves a unit for an account or charges an account in real time according to the MTC service type information in the charging request;

or, after receiving the charging request, the offline charging subsystem adds the MTC service type information thereof in a CDR of the message processing entity.

The message processing entity may be an MTC-IWF and/or an SMS-SC.

In Step 505, the online charging subsystem/offline charging subsystem returns a charging response to the message processing entity.

The charging response may be a CCA or an Accounting Answer (ACA).

In Step 506, the message processing entity forwards the MTC service request message to a subsequent network element.

The subsequent network element may be one of an SMS-SC, an MME, an SGSN, and an MSC.

Further, when offline charging is adopted, the step may take place concurrently with Step 503.

Further, in online charging, the message sending module in the message processing entity has to determine whether to forward the MTC service request message or the MTC service requesting SM only after receiving the charging response sent by the online charging subsystem. When no charging response is received or the returned charging response feeds back a failure in charging, the MTC service request message or the MTC service requesting SM is not forwarded.

An embodiment of the disclosure is further explained below with reference to the flow shown in FIG. 6.

Figure 6:
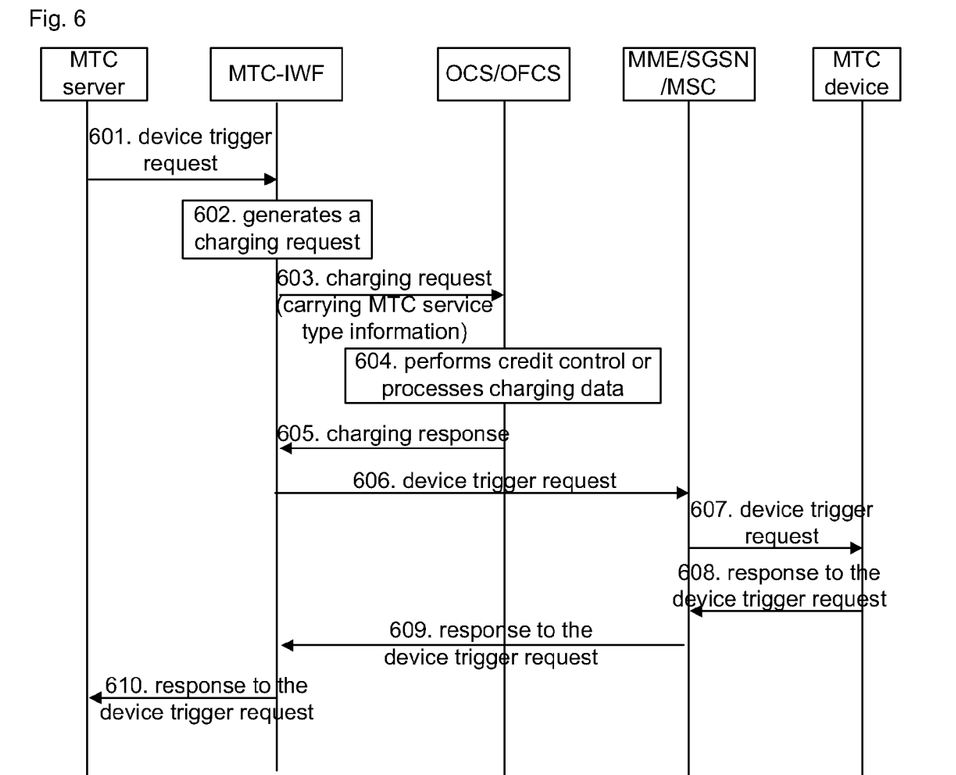
FIG. 6 is a flowchart of T5 interface MTC-IWF billing according to an embodiment of the disclosure.

Embodiment 1 of the disclosure is as shown in FIG. 6, which is a flowchart of T5 interface MTC-IWF billing according to an embodiment of the disclosure. As shown in FIG. 6, in the embodiment, the message processing entity is an MTC-IWF, the MTC service is device trigger. The MTC-IWF delivers the trigger to MME/SGSN/MSC through a T5 interface, which then delivers the trigger to a target MTC device directly through a downlink NAS message. The embodiment mainly includes steps as follows.

In Step 601, an MTC server sends a device trigger request to an MTC-IWF.

In Step 602, the MTC-IWF generates a charging request by processing the device trigger request.

The MTC service type information may be obtained in the step by the MTC-IWF as described in Step 502.

In Step 603, the MTC-IWF sends an online charging subsystem (OCS)/offline charging subsystem (OFCS) the charging request carrying MTC service type information.

The charging request may be a CCR or an ACR.

The MTC service type information may include a combination of one or more of an MTC service type identifier, an MTC-IWF identifier, and an MTC server identifier.

In an embodiment, the MTC service type information may include an MTC service type identifier, and may further include an MTC-IWF identifier and/or an MTC server identifier.

In Step 604, after receiving the charging request, the online charging subsystem reserves a unit for an account or charges an account in real time according to the MTC service type information in the charging request;

or, after receiving the charging request, the offline charging subsystem adds the MTC service type information thereof in a CDR of the message processing entity.

The MTC service type information included in the CDR may include a combination of one or more of an MTC service type identifier, an MTC-IWF identifier, and an MTC server identifier.

In an embodiment, the CDR may include an MTC service type identifier, and may further include an MTC-IWF identifier and/or an MTC server identifier.

In Step 605, the OCS/OFCS returns a charging response to the MTC-IWF.

The charging response may be a CCA or an ACA.

In Step 606, after receiving the charging response, the MTC-IWF forwards the device trigger request to an MME/SGSN/MSC.

In Step 607, the MME/SGSN/MSC forwards the device trigger request to a target MTC device.

The MME/SGSN/MSC may deliver the trigger to the target MTC device directly through a downlink NAS message.

In Step 608, the MTC device returns a response to the device trigger request to the MME/SGSN/MSC.

In Step 609, the MME/SGSN/MSC returns a response to the device trigger request to the MTC-IWF.

In Step 610, the MTC-IWF returns a response to the device trigger request to the MTC server.

Figure 7:
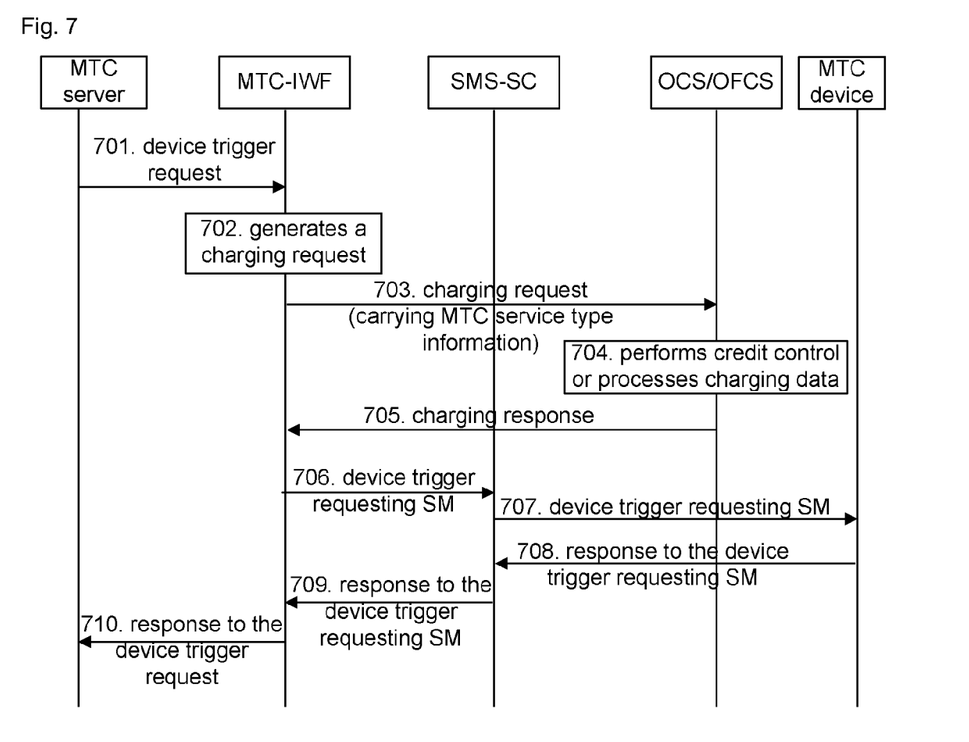
FIG. 7 is a flowchart of T4 interface MTC-IWF billing according to an embodiment of the disclosure.

Embodiment 2 of the disclosure is as shown in FIG. 7, which is a flowchart of T4 interface MTC-IWF billing according to an embodiment of the disclosure. As shown in FIG. 7, in the embodiment, the message processing entity is an MTC-IWF, the MTC service is device trigger. The MTC-IWF converts the received trigger into an SM format trigger and delivers the converted trigger to an SMS-SC through a T4 interface; the trigger is then forwarded to a target MTC device. The embodiment mainly includes steps as follows.

In Step 701, an MTC server sends a device trigger request to an MTC-IWF.

In Step 702, the MTC-IWF generates a charging request by processing the device trigger request.

The MTC service type information may be obtained in the step by the MTC-IWF as described in Step 502.

In Step 703, the MTC-IWF sends an OCS/OFCS the charging request carrying MTC service type information.

The charging request may be a CCR or an ACR.

The MTC service type information may include a combination of one or more of an MTC service type identifier, an MTC-IWF identifier, and an MTC server identifier.

In an embodiment, the MTC service type information may include an MTC service type identifier, and may further include an MTC-IWF identifier and/or an MTC server identifier.

In Step 704, after receiving the charging request, the online charging subsystem reserves a unit for an account or charges an account in real time according to the MTC service type information in the charging request;

or, after receiving the charging request, the offline charging subsystem adds the MTC service type information thereof in a CDR of the message processing entity.

The MTC service type information included in the CDR may include a combination of one or more of an MTC service type identifier, an MTC-IWF identifier, and an MTC server identifier.

In an embodiment, the CDR may include an MTC service type identifier, and may further include an MTC-IWF identifier and/or an MTC server identifier.

In Step 705, the OCS/OFCS returns a charging response to the MTC-IWF.

The charging response may be a CCA or an ACA.

In Step 706, after receiving the charging response, the MTC-IWF forwards a device trigger requesting SM after conversion to SMS-SC.

When the charging subsystem is an offline charging subsystem, the step is executed concurrently with Step 703, and the MTC-IWF does not need to wait for a charging response before forwarding the device trigger request.

In Step 707, after receiving the charging response, the SMS-SC forwards the device trigger requesting SM to an MTC device.

In Step 708, the MTC device returns a response to the device trigger requesting SM to the SMS-SC.

In Step 709, the SMS-SC returns a response to the device trigger requesting SM to the MTC-IWF.

In Step 710, the MTC-IWF returns a response to the device trigger request to the MTC server.

Figure 8:
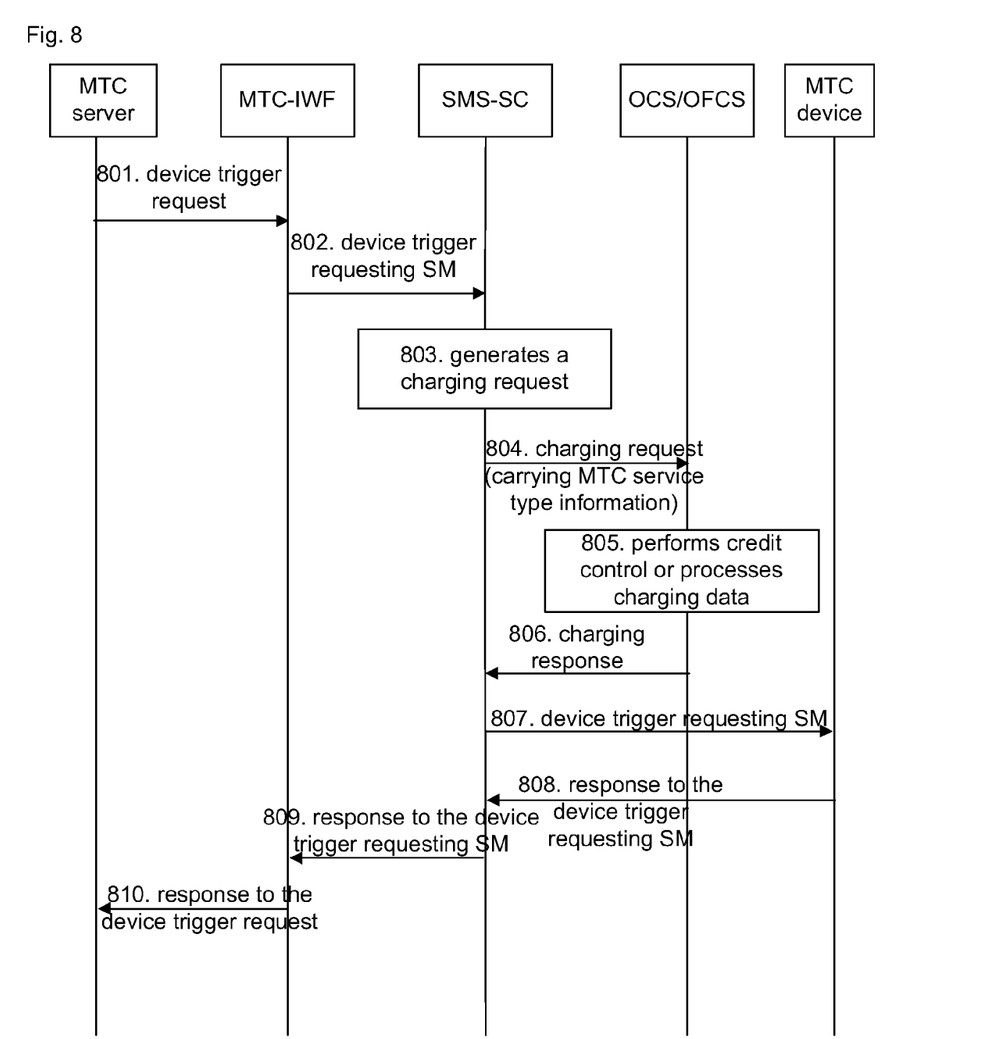
FIG. 8 is a flowchart of T4 interface SMS-SC billing according to an embodiment of the disclosure.

Embodiment 3 of the disclosure is as shown in FIG. 8. which is a flowchart of T4 interface SMS-SC billing according to an embodiment of the disclosure. As shown in FIG. 8, in the embodiment, the message processing entity is an SMS-SC, the MTC service is device trigger. An MTC-IWF converts the received trigger into an SM format trigger and delivers the converted trigger to the SMS-SC through a T4 interface; the trigger is then forwarded to a target MTC device. The embodiment mainly includes steps as follows.

In Step 801, an MTC server sends a device trigger request to an MTC-IWF.

In Step 802, the MTC-IWF sends an SMS-SC a device trigger requesting SM obtained by conversion.

In Step 803, the SMS-SC generates a charging request by processing the device trigger requesting SM.

MTC service type information may be obtained in the step by the SMS-SC as described in Step 502.

In Step 804, the SMS-SC sends an OCS/OFCS the charging request carrying MTC service type information.

The charging request may be a CCR or an ACR.

The MTC service type information may include a combination of one or more of an MTC service type identifier, an MTC-IWF identifier, and an MTC server identifier.

In an embodiment, the MTC service type information may include an MTC service type identifier, and may further include an MTC-IWF identifier and/or an MTC server identifier.

In Step 805, after receiving the charging request, the online charging subsystem reserves a unit for an account or charges an account in real time according to the MTC service type information in the charging request;

or, after receiving the charging request, the offline charging subsystem adds the MTC service type information thereof in a CDR of the message processing entity.

The MTC service type information included in the CDR may include a combination of one or more of an MTC service type identifier, an MTC-IWF identifier, and an MTC server identifier.

In an embodiment, the CDR may include an MTC service type identifier, and may further include an MTC-IWF identifier and/or an MTC server identifier.

In Step 806, the OCS/OFCS returns a charging response to the SMS-SC.

The charging response may be a CCA or an ACA.

In Step 807, after receiving the charging response, the SMS-SC forwards the device trigger requesting SM to an MTC device.

When the charging subsystem is an offline charging subsystem, the step is executed concurrently with Step 804; the device trigger request will be encapsulated in an SM format before being forwarded.

In Step 808, the MTC device returns a response to the device trigger requesting SM to the SMS-SC.

In Step 809, the SMS-SC returns a response to the device trigger requesting SM to the MTC-IWF.

In Step 810, the MTC-IWF returns a response to the device trigger request to the MTC server.

Figure 9:
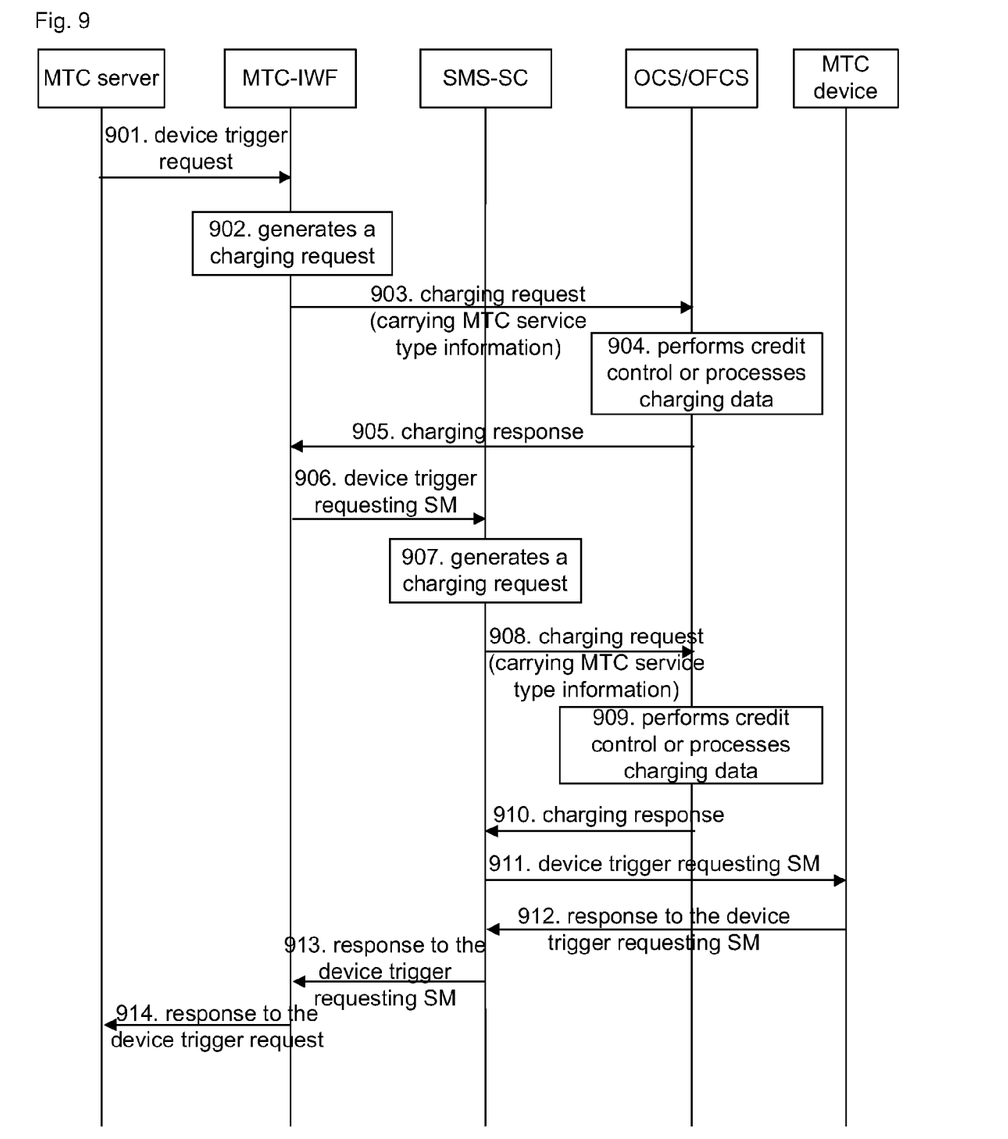
FIG. 9 is a flowchart of T4 interface MTC-IWF and SMS-SC billing according to an embodiment of the disclosure.

Embodiment 4 of the disclosure is as shown in FIG. 9. which is a flowchart of T4 interface SMS-SC and MTC-IWF billing according to an embodiment of the disclosure. As shown in FIG. 9, in the embodiment, the message processing entity is an SMS-SC and an MTC-IWF, and the MTC service is device trigger. The MTC-IWF converts the received trigger into an SM format trigger and delivers the converted trigger to the SMS-SC through a T4 interface; the trigger is then forwarded to an MTC device. The embodiment mainly includes steps as follows.

In Step 901, an MTC server sends a device trigger request to an MTC-IWF.

In Step 902, the MTC-IWF generates a charging request by processing the device trigger request.

The MTC service type information may be obtained in the step by the MTC-IWF as described in Step 502.

In Step 903, the MTC-IWF sends an OCS/OFCS the charging request carrying MTC service type information.

The charging request may be a CCR or an ACR.

The MTC service type information may include a combination of one or more of an MTC service type identifier, an MTC-IWF identifier, and an MTC server identifier.

In an embodiment, the MTC service type information may include an MTC service type identifier, and may further include an MTC-IWF identifier and/or an MTC server identifier.

In Step 904, after receiving the charging request, the online charging subsystem reserves a unit for an account or charges an account in real time according to the MTC service type information in the charging request;

or, after receiving the charging request, the offline charging subsystem adds the MTC service type information thereof in a CDR of the message processing entity.

The MTC service type information included in the CDR may include a combination of one or more of an MTC service type identifier, an MTC-IWF identifier, and an MTC server identifier.

In an embodiment, the CDR may include an MTC service type identifier, and may further include an MTC-IWF identifier and/or an MTC server identifier.

In the embodiment, both the MTC-IWF and the SMS-SC will generate a corresponding CDR, and a unified CDR file has to be generated by associating both CDRs according to corresponding identifiers in the online charging subsystem/offline charging subsystem and then sent to a charging centre.

In Step 905, the OCS/OFCS returns a charging response to the MTC-IWF.

The charging response may be a CCA or an ACA.

In Step 906, after receiving the charging response, the MTC-IWF forwards a device trigger requesting SM after conversion to an SMS-SC.

When the charging subsystem is an offline charging subsystem, the step is executed concurrently with Step 903.

In Step 907, the SMS-SC generates a charging request by processing the received device trigger requesting SM.

MTC service type information may be obtained by the SMS-SC in the step as described in Step 502.

In Step 908, the SMS-SC sends an OCS/OFCS the charging request carrying MTC service type information.

In Step 909, after receiving the charging request, the online charging subsystem reserves a unit for an account or charges an account in real time according to the MTC service type information in the charging request;

or, after receiving the charging request, the offline charging subsystem adds the MTC service type information thereof in a CDR of the message processing entity.

In the embodiment, in offline charging, both the MTC-IWF and the SMS-SC will generate a corresponding CDR, and a unified CDR file has to be generated by associating both CDRs according to corresponding identifiers in the offline charging subsystem and then sent to a charging centre.

In Step 910, the OCS/OFCS returns a charging response to the SMS-SC.

In Step 911, after receiving the charging response, the SMS-SC forwards the device trigger requesting SM to an MTC device.

When the charging subsystem is an offline charging subsystem, the step is executed concurrently with Step 908.

In Step 912, the MTC device returns a response to the device trigger requesting SM to the SMS-SC.

In Step 913, the SMS-SC returns a response to the device trigger requesting SM to the MTC-IWF.

In Step 914, the MTC-IWF returns a response to the device trigger request to the MTC server.

What described are merely embodiments of the disclosure, and are not intended to limit the protection scope of the disclosure.

The invention claimed is:

1. A charging method for Machine-Type Communication (MTC), comprising steps of:
   after receiving an MTC service request message or an MTC service requesting Short Message (SM), generating, by a message processing entity, a charging request including MTC service type information, and sending the charging request to an online charging subsystem or offline charging subsystem; and
   after receiving the charging request, performing, by the online charging subsystem or offline charging subsystem, a charging operation according to an MTC service type, and returning a charging response to the message processing entity,
   wherein the MTC service type information comprises an MTC InterWorking Function (MTC-IWF) identifier,
   wherein different MTC service types are distinguished from each other according to the MTC service type information by:
   inferring, by the online charging subsystem or offline charging subsystem, the MTC service type corresponding to the MTC-IWF identifier included in the charging request.

2. The method according to claim 1, further comprising:
   after receiving the charging request, reserving, by the online charging subsystem, a unit for an account or charging an account in real time according to the MTC service type information;
   or, after receiving the charging request, filling, by the offline charging subsystem, the MTC service type information in a charging data record generated by the message processing entity.

3. The method according to claim 1, wherein the MTC service type is one of: an MTC device trigger, an MTC location specific trigger, and an MTC small data packet transmission.

4. The method according to claim 1, wherein the message processing entity obtains the MTC service type information included in the MTC service request message or the MTC service requesting SM by:
   obtaining the MTC service type information from a message type of a header of the MTC service request message or the MTC service requesting SM; or
   obtaining the MTC service type information from a service type of a header of the MTC service request message or the MTC service requesting SM; or
   obtaining the MTC service type information from a byte of a body of the MTC service request message or the MTC service requesting SM.

5. The method according to claim 1, wherein the message processing entity is an MTC InterWorking Function (MTC-IWF) and/or a Short Message Service-Service Centre (SMS-SC).

6. The method according to claim 2, wherein the message processing entity is an MTC InterWorking Function (MTC-IWF) and/or a Short Message Service-Service Centre (SMS-SC).

7. The method according to claim 3, wherein the message processing entity is an MTC InterWorking Function (MTC-IWF) and/or a Short Message Service-Service Centre (SMS-SC).

8. The method according to claim 4, wherein the message processing entity is an MTC InterWorking Function (MTC-IWF) and/or a Short Message Service-Service Centre (SMS-SC).

9. A charging system for Machine-Type Communication (MTC), comprising: a message processing entity and an online charging subsystem or offline charging subsystem, wherein
   the message processing entity is configured for: after receiving an MTC service request message or an MTC service requesting Short Message (SM), generating a charging request including MTC service type information, and sending the charging request to the online charging subsystem or offline charging subsystem; and
   the online charging subsystem or offline charging subsystem is configured for: after receiving the charging request, performing a charging operation according to an MTC service type, and returning a charging response to the message processing entity,
   wherein the MTC service type information comprises an MTC InterWorking Function (MTC-IWF) identifier,
   wherein the online charging subsystem or offline charging subsystem is further configured for:
   inferring the MTC service type corresponding to the MTC-IWF identifier included in the charging request.

10. The system according to claim 9, wherein the MTC service type is one of: an MTC device trigger, an MTC location specific trigger, and an MTC small data packet transmission.

11. The system according to claim 9, wherein the message processing entity is further configured for obtaining the MTC service type information included in the MTC service request message or the MTC service requesting SM by:
   obtaining the MTC service type information from a message type of a header of the MTC service request message or the MTC service requesting SM; or
   obtaining the MTC service type information from a service type of a header of the MTC service request message or the MTC service requesting SM; or
   obtaining the MTC service type information from a byte of a body of the MTC service request message or the MTC service requesting SM.

12. The system according to claim 9, wherein the message processing entity is an MTC InterWorking Function (MTC-IWF) and/or a Short Message Service-Service Centre (SMS-SC).

13. A message processing entity, comprising:
   a processor; and
   a memory for storing instructions executable by the processor,
   wherein the processor is configured for:
   receiving a Machine-Type Communication (MTC) service request message or an MTC service requesting Short Message (SM), generating a charging request including MTC service type information, and sending the charging request to an online charging subsystem or offline charging subsystem; and
   receiving a charging response returned by the online charging subsystem or offline charging subsystem,
   wherein the MTC service type information comprises an MTC InterWorking Function (MTC-IWF) identifier,
   such that the online charging subsystem or offline charging subsystem
   infers an MTC service type corresponding to the MTC-IWF identifier included in the charging request.

14. The message processing entity according to claim 13, wherein the MTC service type is one of: an MTC device trigger, an MTC location specific trigger, and an MTC small data packet transmission.

15. The message processing entity according to claim 13, wherein the processor is further configured for obtaining the MTC service type information included in the MTC service request message or the MTC service requesting SM by:
   obtaining the MTC service type information from a message type of a header of the MTC service request message or the MTC service requesting SM; or
   obtaining the MTC service type information from a service type of a header of the MTC service request message or the MTC service requesting SM; or
   obtaining the MTC service type information from a byte of a body of the MTC service request message or the MTC service requesting SM.

16. The message processing entity according to claim 13, wherein the message processing entity is an MTC Inter-Working Function (MTC-IWF) and/or a Short Message Service-Service Centre (SMS-SC).

17. The message processing entity according to claim 14, wherein the message processing entity is an MTC Inter-Working Function (MTC-IWF) and/or a Short Message Service-Service Centre (SMS-SC).

* * * * *